United States Patent [19]
Crawford et al.

[11] 3,848,640
[45] Nov. 19, 1974

[54] TUBING MADE FROM B-STAGED EPOXY RESIN COMPOSITION

[75] Inventors: Thomas G. Crawford, Hampton; William E. Kearse, Fairfax, both of S.C.

[73] Assignee: Westinghouse Electric Corporation, Pittsburgh, Pa.

[22] Filed: Feb. 6, 1973

[21] Appl. No.: 330,155

Related U.S. Application Data
[63] Continuation-in-part of Ser. No. 188,803, Oct. 13, 1971, abandoned.

[52] U.S. Cl..... 138/145, 117/126 G E, 138/DIG. 7, 138/141
[51] Int. Cl............................................. F16l 9/16
[58] Field of Search ...... 138/140, 141, 145, DIG. 2, 138/DIG. 7, DIG. 145; 242/7; 260/32 CP; 156/330; 161/184, 176; 117/126 GE

[56] References Cited
UNITED STATES PATENTS

| | | | |
|---|---|---|---|
| 2,726,185 | 12/1955 | Howald | 161/176 X |
| 2,976,889 | 3/1961 | Cannady, Jr. | 138/141 |
| 3,264,235 | 8/1966 | Hustin | 260/32 EP |
| 3,329,652 | 7/1967 | Christie | 161/185 X |
| 3,429,760 | 2/1969 | Roskos et al. | 156/167 |
| 3,677,804 | 7/1972 | Kalnin | 117/126 GE |

OTHER PUBLICATIONS

Publ. Handbook of Epoxy Resins Lee & Neville July 1967, TP 1180 E6 L4 C3, pp. 12-22, 12-23.

*Primary Examiner*—James J. Gill, Jr.
*Assistant Examiner*—Daniel M. Yasich
*Attorney, Agent, or Firm*—R. D. Fuerle

[57] ABSTRACT

A treated cloth is disclosed which comprises a fabric impregnated with an epoxy composition having a greenness of about 6 to about 35 percent, the composition comprising about 55 to about 75 percent epoxy resin and about 25 to about 45 percent trimellitic anhydride. A tube is formed by winding the treated cloth on a mandrel then curing it. A retainer ring is formed from the tube.

14 Claims, 2 Drawing Figures

TUBING MADE FROM B-STAGED EPOXY RESIN COMPOSITION

CROSS REFERENCE TO RELATED APPLICATION

This application is a continuation-in-part of copending application Ser. No. 188,803, filed Oct. 13, 1971, titled "Composition, Treated Cloth, and Tubing," and now abandoned.

BACKGROUND OF THE INVENTION

Retainer rings are flat rings containing holes in which ball bearings ride. Steel retainer rings are very noisy and may be too heavy for a particular application. Retainer rings have been made of cloth impregnated with phenolic resins, but such rings must be machined to a larger size than desired as they shrink. It is not always possible to estimate exactly how much a particular ring will shrink and the shrinkage may be non-uniform causing the ring to become out-of-round. If the ring is not round the bearing may be noisy and may wear more rapidly.

The tubing from which various shapes are machined has been made from cloth impregnated with chlorendic anhydride-catalyzed epoxy resin. However, the chlorendic anhydride gave off noxious fumes which often made workers ill.

While it is known that trimellitic anhydride (TMA) would catalyze an epoxy resin, it was believed that a cloth impregnated with B-staged trimellitic anhydride-catalyzed epoxy resin could not be made due to the tendency of TMA to precipitate from the resin. A TMA-catalyzed epoxy resin in a mold can be stirred to produce a homogeneous suspension and therefore a properly catalyzed resin, but one cannot stir a resin impregnated on a cloth. Therefore, it was believed that when the TMA precipitated on the cloth it would leave the resin insufficiently catalyzed so that it could be neither B-staged nor cured.

SUMMARY OF THE INVENTION

We have found that a fabric impregnated with a B-staged epoxy resin composition containing trimellitic anhydride as a curing catalyst can be made.

We have also found that shapes made therefrom have exceptionally high dimensional stability. After manufacture, the shapes display little or no change in dimensions under ambient conditions. Also, the shapes have less water absorption, a higher dielectric constant (i.e., it is a better electrical insulator), and are easier to machine (in that the machining tools last much longer before they must be replaced) than do phenolic resin shapes.

THE DRAWING

Figure 1:
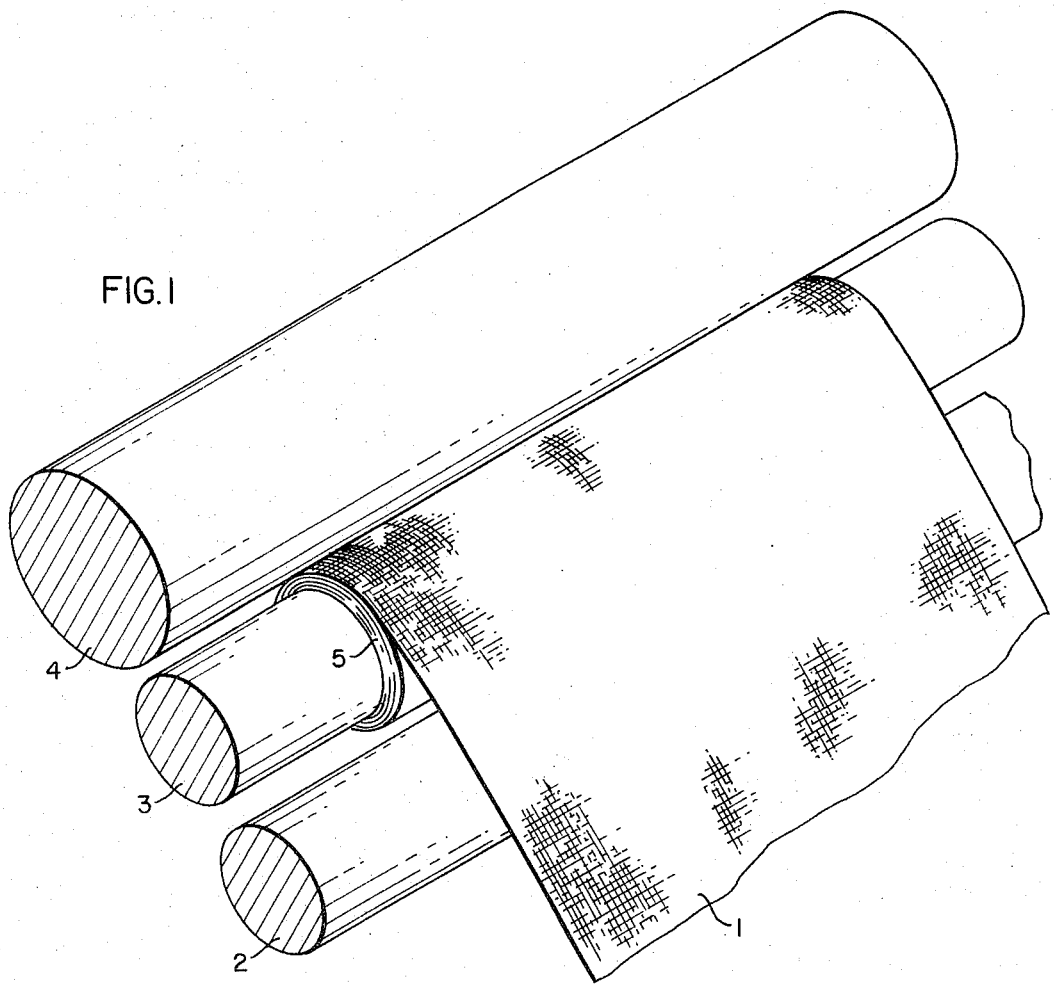
FIG. 1 is an isometric view showing a treated cloth being formed into a convoluted tube.

In FIG. 1 a treated cloth 1 is passed over a heated roll 2 and is convolutely wound over a heated mandrel 3. A roller 4 smooths and compresses successive layers of cloth to form convoluted tube 5.

Figure 2:
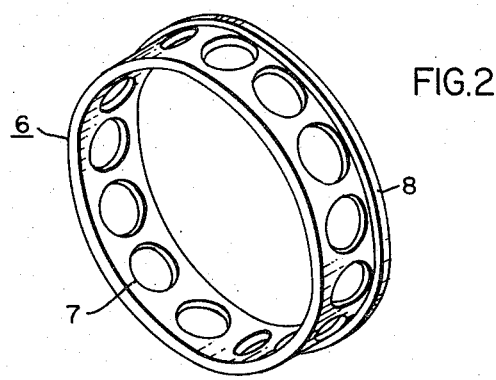
FIG. 2 is an isometric view of a retainer ring.

In FIG. 2 a retainer ring 6 has multiple, evenly-shaped, radially-aligned circular holes 7 therethrough for separating and spacing ball bearings (not shown). A flange 8 is used to hold the ring in position in a race (not shown).

THE FABRIC

The fabric may be a mat but it is preferably a woven cloth, as woven cloth is more uniform and stronger. However, mats would be satisfactory for making plates and roving could be used for making bars or rods.

A woven cloth preferably has a count of at least about 64 × about 70 as heavier cloth does not impregnate and machine well, and also preferably has a count of less than about 100 × about 100 as finer cloths are too expensive; a count of about 80 × about 80 offers the best compromise of these opposing considerations (the count is the threads per inch in each direction).

The individual fibers are typically 0.0036 to 0.0056 inches in diameter and are twisted into threads (typically weighing 1 lb. per 75 to 900 yds.) which may be woven into a cloth. A cloth is preferably about 2 to about 7 mils thick and weighs about 1.44 to about 9 oz/sq. yd. since finer and lighter cloths may stretch, warp, or snap and thicker and heavier cloths may crack when wound on the mandrel and do not machine as well. Generally, fine, light cloth is used for small diameter mandrels and the thick, heavy cloth for larger diameter mandrels.

A woven cloth is typically about 38 to 52 inches wide although wider and narrower cloths are quite feasible. If the cloth is glass it is preferably treated with a bonding compound to aid in its adherence to the epoxy composition. For example, the cloth may be heat cleaned, coated with methacrylate chromic chloride or preferably an aminosilane, which is then cured and washed.

If the shape must not be abrasive, then the fabric is preferably cotton as it is inexpensive and non-abrasive, but polyesters such as polyethylene terephthalate (sold by DuPont under the trademark "Darcon"), and other non-abrasive materials could also be used. If abrasive properties are not important, the fabric is preferably glass as shapes made from glass fabrics are stronger and retain their properties better at high temperatures.

THE EPOXY COMPOSITION

The epoxy composition comprises about 55 to about 75 percent (all percentages herein are by weight) epoxy resin having an average E.E.W. (epoxy equivalent weight) of about 180 to about 550 and about 25 to about 45 percent trimellitic anhydride. The preferred epoxy composition, gives the best properties, comprises about 60 to about 70 percent epoxy resin having an average E.E.W. of about 220 to about 365 and about 30 to about 40 percent trimellitic anhydride.

The epoxy resin may be a single resin or a mixture of two or more resins which have an average E.E.W. within the limits given. A combination which works very well and is preferred is about 55 to about 80 percent of an epoxy resin having an E.E.W. of about 175 to about 200 and a viscosity of about 10,000 to about 19,000 cps (centipoises) and about 20 to about 45 percent of an epoxy resin having an E.E.W. of about 425 to about 575 and a viscosity of about 1,000 to about 8,500 cps.

The epoxy resin is a diepoxide which may be either cycloaliphatic or aromatic; the diglycidyl ether of bisphenol A is preferred because of its ready availability. Cycloaliphatic diepoxides may be prepared by the preoxidation of olefins and by various other known techniques. Examples of suitable cycloaliphatic diepoxides include vinyl-cyclohexane dioxide, and dicyclopentadiene dioxide, alicyclic diepoxy adipate, and alicyclic diepoxy carboxylate.

Examples of suitable aromatic diepoxides include N,N-diglycidyl-2,4,6-tribromoaniline, the phenolic adduct of dichloromethyl diphenyl oxide, and low molecular weight resins (i.e., diphenyl-diglycidyl ether monomers which may include up to about 40 percent oligomers) formed by reacting an epihalohydrin with an aromatic diphenol. The epihalohydrin used may be described by the general formula:

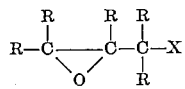

where each R is independently selected from hydrogen and alkyl to $C_4$ and X is halogen; epichlorohydrin is preferred because it is commercially obtainable. Examples of other epihalohydrins within the general formula are 1-chloro-3-methylhydrin, 1-bromo-3,3-dimethylhydrin and 1-fluoro-2-ethylhydrin.

Examples of aromatic diphenols which may be used to form the aromatic diepoxide include hydroquinone, resorcinol, 2,2-bis(4-hydroxyphenyl) propane, 2,2-bis(4-hydroxyphenyl) pentane, 2,2-bis(4-hydroxyphenyl) phloroglucinol, 2,2-bis(4-hydroxyphenyl) propane, 2,2-bis (4-hydroxyphenol) methane, and the like, as well as phenols of the formulae:

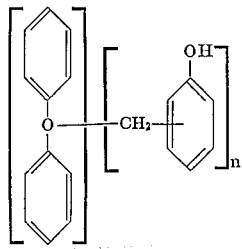

where n = 1, 2, 3 or mixtures thereof, but preferably n = 2.

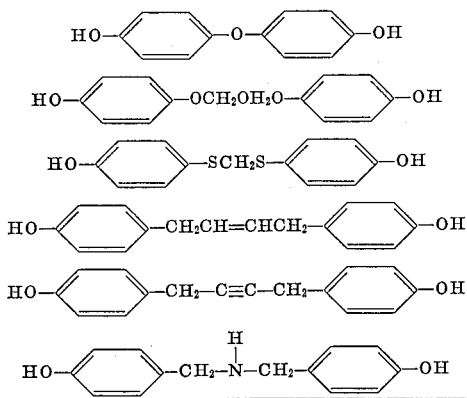

Up to about 5 percent by weight of a phenol having three or more hydroxyl groups, such as 3,5-dihydroxyphenol, may be used to form the diepoxide in order to decrease the gel time.

THE TREATED CLOTH

To prepare the treated cloth the epoxy composition is first dissolved in a solvent for the trimellitic anhydride. Suitable solvents include acetone, dioxane, cellosolve acetate, methyl ethyl ketone, methyl isobutyl ketone, cyclohexanone, etc., as well as mixtures of solvents. The preferred solvent is methylethyl ketone as it is inexpensive and works well. The amount of solvents is about 15 to 45 percent (based on the resin plus TMA), and preferably about 20 to 35 percent.

It may be desirable to include a filler such as glass beads, chalk, clay, etc. in the composition particularly if the composition is to be used in making plate. However, the filler is preferably not included if the composition is to be used in making tubing as it dulls the tools used in machining the tubing. Other optional ingredients include dyes, pigments, etc.

The fabric is immersed in a bath of the epoxy composition and solvent and is then squeezed between rollers, typically 0.009 to 0.012 inches apart, to remove the excess composition. The impregnated fabric passes through an oven which evaporates the solvent and cures the composition to the "B stage." The temperature in the oven is typically 260° to 315°F and the speed is typically 200 to 300 inches per minute (3 to 12 minutes in the oven).

At the "B stage" the composition is tacky but not liquid. This stage may be described by its "greenness" which is a measurement of the viscosity of the composition. Greenness is measured by pressing six 6 by 6 inch sheets of the treated cloth at 250 psi and 325°F for 5 minutes, scraping off and weighing the composition which is squeezed beyond the 6 by 6 inch sheets, and expressing that amount as a percent of initial weight of the sheets. The greenness should be greater than 6 percent to avoid poor bonding of the layers, and should be less than 35 percent to avoid excessive running of the composition. In curing to the B stage, a glass fabric typically moves at 200 to 300 inches per minute and spends about 1½ minutes in a first oven zone at 280°–290°F and an additional 1½ minutes in a second oven zone at 290°–310°F. In curing a non-glass fabric to the B stage an oven may be used with five temperature zones of 270° to 280°F, 280° to 290°F, 290° to 300°F, 305° to 315°F and 310° to 320°F; the fabric may move at 250 to 325 inches per minute and spend about 2 minutes in each of the five temperature zones. The resin to cloth ratio after B staging is preferably about 1.5 to about 1.9 if the cloth is glass and about 2 to about 3 if the cloth is not glass. The treated cloth produced is then wound onto a paper core, sealed in polyethylene, and stored at −32°F to prevent further curing (i.e., a loss of greenness) until it is ready to be used.

THE TUBING

The tubing is made by wrapping the treated cloth over a mandrel to produce concentric layers, then curing the resin. Typically, the treated cloth is pulled over a hot roll at 135° to 175°C and about two to about 150 layers of the cloth are wrapped over a 100° to 120°C mandrel at 60 to 80 inches per minute.

The mandrel is usually round but may be rectangular or another shape is a tube of that shape is desired. If the wrappings are parallel and overlap completely "convolute" tubing is produced. If the wrappings do not completely overlap, a spiral tube is produced. While a convolute tube is only as long as the width of the cloth, a spiral tube may be any length. However, convolute tubing is preferred as it has more utility at the present time.

The cloth is cut and the tube is cured at about 145° to about 155°C for about 1½ to about 2 hours per one-eighth inch of wall thickness. Higher cure temperatures are used if the greenness is low and lower cure temperatures are used if the greenness is high. The tube is then ground to the approximately desired size and machined to the exact dimensions desired. A typical tube may have a one thirty-second to one-half inch thick wall and a diameter of one-half to 60 inches. The treated cloth can also be used to make rods, sheets, plates, films, etc.

The following examples further illustrate the invention:

| Ingredients | Composition (%) | | | |
|---|---|---|---|---|
| | A | B | C | D |
| diglycidyl ether of bisphenol A (E.E.W. = 180 to 195, viscosity = 10,000 to 16,000 cps at 25°C) sold by Shell Chemical Co. under the trademark "Epon 828" | 31.0 | 37.9 | 44.8 | 21.1 |
| diglycidyl ether of bisphenol A (E.E.W. = 425 to 550, viscosity = 35,000 to 85,000 cps at 25°C) sold by Shell Chemical Co. under the trademark "Epon 1001" | 13.5 | 16.5 | 20.8 | 10.5 |
| trimellitic anhydride | 16.0 | 19.5 | 16.3 | — |
| chlorendic anhydride | — | — | — | 28.5 |
| methylethyl ketone | 23.8 | 23.0 | 15.2 | 6.5 |
| acetone | 3.8 | 3.1 | 2.9 | — |
| toluene | — | — | — | 17.2 |
| clay filler sold by United Sierra under the trademark "Unimal 310" | 11.9 | — | — | 16.2 |

The compositions were prepared by charging a vessel with the anhydride curing agent, the solvents, and heating to 40–50°C until a solution was obtained. The epoxy resins were added and dissolved and the filler, if used, was stirred in.

Glass cloths 38 inches wide were immersed in each composition and the excess resin was removed to give a resin to glass ratio of 1.68 to 1.82. One cloth was treated with each composition except that two cloths were treated with composition D. The cloths were passed through an oven having a 280° to 290°F zone followed by a 290° to 310°F zone at 200 to 300 inches per minute, spending about 1½ minutes in each zone. The greenness was measured as 10 to 18 percent for each cloth.

A 1 inch I.D. × 1¼ inch O.D. convolute tube was made from each cloth, by passing it over a hot roll at 135° to 175°C, and winding it on a mandrel at 80° to 100°C at a speed of 60 to 80 inches per minute. The tubes were then baked on the mandrel for 3 hours at 150°C. One of the tubes which was made with composition B was given a postcure at 180°C for 14 hours. The following table gives the results of various tests performed on the tubes, and shows the superior properties of the tube made from Compositions A, B and C, the compositions of this invention as compared to the two tubes made from Composition D.

| | Composition | | |
|---|---|---|---|
| | A, B, and C | D | D |
| Water Absorption ASTM D570 (%) | 0.04 | 0.15 | 0.15 |
| Specific Gravity (grams/cc) | 1.98 | 1.80 | 1.80 |
| Axial Compressive Strength ASTM D348 (psi) | 40,000 | 30,000 | 30,000 |
| Axial Compressive Strength at 150°C ASTM D348 (psi) | 17,000 | 3,500 | 12,000 |
| Dielectric Strength ASTM D348 (volts per mil) | 450 | 300 | 300 |

EXAMPLE 2

Using the procedure of Example 1 a tube was prepared from the following composition:
  37.9 percent "Epon 828" epoxy resin
  16.5 percent "Epon 1001" epoxy resin
  19.5 percent trimellitic anhydride
  23.0 percent methylethyl ketone
  3.1 percent acetone The tube had the same or superior properties as the tube prepared from Compositions A, B and C in Example 1, but had better machinability than the tube prepared from Composition A since no filler was present.

Using a screwmachine, welding torch nozzles, were machined from the tubing of this example. It was found that the tools of the screw machine had to be replaced every eight hours. Previously, they had to be replaced every 2 hours when tubes were machined which were made from a postcured composition of:
  25.2 percent "Epon 828" epoxy resin
  12.5 percent "Epon 1001" epoxy resin
  34.0 percent chlorendic anhydride
  20.5 percent toluene
  7.8 percent methylethyl ketone

EXAMPLE 3

Woven, bleached cotton cloth 52 inches wide having a count of 80 × 80 was immersed in the following composition:
  37.9 percent "Epon 828"
  16.5 percent "Epon 1001"
  19.5 percent TMA
  23.0 percent methylethyl ketone
  3.1 percent acetone The impregnated cloth was passed through a zoned hot air oven having a temperature range of 275° to 315°F. It then had a resin to cloth ratio of 2.60 and a greenness of 20.0 percent The cloth was passed over a roll heated to 130° to 160°C and convolutely wrapped over a 2 inch mandrel heated to 90° to 110°C to form a tube of one-half inch wall thickness. The tube on the mandrel was baked for four hours at 150°C, stripped from the mandrels, ground to remove loose material, and machined into a retainer ring similar to that of FIG. 2. After two months at ambient conditions the dimensions of the ring had not changed, even to the extent of 0.001 of an inch. In contrast, identical rings made from phenolic resin shrink 0.001 to 0.005 inches after 2 months at ambient conditions.

We claim as our invention:

1. A tube comprising a cured cylinder formed from a plurality of wrapped concentric layers of a treated cloth, said treated cloth comprising a fabric impregnated with an epoxy resin composition having a greeness of about 6 to 35 percent, said composition comprising about 55 to 75 percent epoxy resin having an average epoxy equivalent weight of about 220 to 365 and about 25 to about 45 percent trimellitic anhydride, the composition initially dissolved in a solvent for the trimellitic anhydride and the fabric initially cured to the B-stage.

2. A tube according to claim 1 wherein said wrapped layers are convolute.

3. A tube according to claim 1 which is about one-half to about 60 inches in diameter and has a wall thickness of about one thirty-second to about one-half inch.

4. A tube according to claim 1 wherein said fabric is selected from the group consisting of woven glass cloth, woven polyethylene terephthalate cloth, polyethylene terephthalate mat, woven cotton cloth, and cotton mat.

5. A tube according to claim 4 wherein said fabric is glass and the ratio of said composition to said glass is about 1.5 to about 1.9.

6. A tube according to claim 4 wherein said fabric is cotton and the ratio of said composition to said cotton is about 2 to about 3.

7. A tube according to claim 6 wherein said cotton is woven cotton cloth.

8. A tube according to claim 1 wherein said fabric is woven and has a count between 64 × 70 and 100 × 100.

9. A tube according to claim 8 wherein said count is about 80 × about 80.

10. A tube according to claim 1 wherein said epoxy resin is a diglycidyl ether of bisphenol A.

11. A tube according to claim 1 wherein said treated cloth is about 2 to about 7 mils thick and about 38 to about 52 inches wide.

12. A tube according to claim 1 wherein said composition comprises about 60 to about 70 percent epoxy resin having an E.E.W. of about 220 to about 365 and about 30 to about 40 percent trimellitic anhydride.

13. A tube according to claim 1 wherein said epoxy resin is a mixture of about 55 to about 80 percent of an epoxy resin having an E.E.W. of about 175 to about 200 and a viscosity of about 10,000 to about 19,000 cps and about 20 to about 45 percent of an epoxy resin having an E.E.W. of about 425 to 575 and a viscosity of about 1,000 to about 8,500 cps.

14. A tube according to claim 1 having multiple, evenly-spaced, radially aligned, circular holes therethrough.

* * * * *